United States Patent
Larsen

(10) Patent No.: US 10,660,279 B2
(45) Date of Patent: *May 26, 2020

(54) IRRIGATION MANAGEMENT

(71) Applicant: Smart Rain Systems, LLC, Centerville, UT (US)

(72) Inventor: Rudy Lars Larsen, Bountiful, UT (US)

(73) Assignee: Smart Rain Systems, LLC, Centerville, UT (US)

( * ) Notice: Subject to any disclaimer, the term of this patent is extended or adjusted under 35 U.S.C. 154(b) by 557 days.

This patent is subject to a terminal disclaimer.

(21) Appl. No.: 14/922,838

(22) Filed: Oct. 26, 2015

(65) Prior Publication Data

US 2016/0050859 A1 Feb. 25, 2016

Related U.S. Application Data

(63) Continuation of application No. 13/899,544, filed on May 21, 2013, now Pat. No. 9,307,706.
(Continued)

(51) Int. Cl.
*A01G 25/16* (2006.01)
*G05B 19/048* (2006.01)

(52) U.S. Cl.
CPC ........... *A01G 25/16* (2013.01); *A01G 25/165* (2013.01); *G05B 19/048* (2013.01); *G05B 2219/2625* (2013.01)

(58) Field of Classification Search
CPC .... A01G 25/16; A01G 25/165; A01G 25/167; A01G 25/092; A01G 25/162; A01G 1/00;
(Continued)

(56) References Cited

U.S. PATENT DOCUMENTS 6,298,285 B1 * 10/2001 Addink .................. A01G 25/16
239/63
6,782,311 B2 * 8/2004 Barlow ................ A01G 25/165
238/68
(Continued)

FOREIGN PATENT DOCUMENTS

WO WO-2010099348 A1 * 9/2010 ......... G05B 23/0272

OTHER PUBLICATIONS

Rainbird Corporation, "IQ LXM-DTC Satelite Controller Installation & User Guide for the IQ Central Control System", User Manual, 2006, 82pgs, P/N 636544-010 Rev A, Tucson, AZ.
(Continued)

*Primary Examiner* — Darrin D Dunn
(74) *Attorney, Agent, or Firm* — Durham Jones & Pinegar; James Larson; Sarah W. Matthews

(57) ABSTRACT

A system and method for providing irrigation management services is disclosed. The system may include a plurality of controllers, where each controller controls application of water by an irrigation system associated with the controller. A central computer that is remote from each of the controllers may be configured to implement an irrigation management plan that is individualized to each location and based, at least in part, upon one or more characteristics of the location as determined by an on-site visit. The irrigation manager may guarantee that the system will provide a return on investment within a predefined period of time. The system may also detect faults in the irrigation systems using water usage data from the controllers and diagnose the faults. A technician may be notified and dispatched to repair the faults.

15 Claims, 5 Drawing Sheets

Related U.S. Application Data

(60) Provisional application No. 61/649,824, filed on May 21, 2012.

(58) Field of Classification Search
CPC ........ A01G 1/001; A01G 25/06; A01G 25/09; A01G 27/003; G05B 15/02; G05B 2219/2625; G05B 2219/23227; G05B 19/43
See application file for complete search history.

(56) References Cited

U.S. PATENT DOCUMENTS

| | | | | |
|---|---|---|---|---|
| 6,823,239 | B2* | 11/2004 | Sieminski | A01G 25/167 239/69 |
| 7,048,204 | B1* | 5/2006 | Addink | A01G 25/167 137/78.2 |
| 8,396,821 | B2* | 3/2013 | Kuhns | G06Q 10/06 706/48 |
| 8,417,533 | B2 | 4/2013 | Clawson | |
| 8,565,927 | B1* | 10/2013 | Campbell | A01G 25/167 111/118 |
| 8,650,069 | B2* | 2/2014 | Mason, Sr. | G06Q 10/06 705/7.35 |
| 8,751,052 | B1* | 6/2014 | Campbell | A01G 25/167 324/667 |
| 10,194,598 | B2* | 2/2019 | Bauman | A01G 25/16 |
| 2003/0093159 | A1* | 5/2003 | Sieminski | A01G 25/167 700/12 |
| 2004/0030456 | A1* | 2/2004 | Barlow | A01G 25/165 700/284 |
| 2004/0117154 | A1 | 6/2004 | Lane | |
| 2005/0216130 | A1* | 9/2005 | Clark | A01G 25/16 700/284 |
| 2009/0099701 | A1* | 4/2009 | Li | A01G 25/16 700/284 |
| 2009/0216345 | A1* | 8/2009 | Christfort | G05B 19/0428 700/21 |
| 2009/0271045 | A1* | 10/2009 | Savelle, Jr. | A01G 25/167 700/284 |
| 2009/0281672 | A1* | 11/2009 | Pourzia | A01G 25/167 700/284 |
| 2010/0305764 | A1* | 12/2010 | Carr | A01G 25/16 700/284 |
| 2011/0093123 | A1* | 4/2011 | Alexanian | A01G 25/16 700/284 |
| 2011/0137827 | A1 | 6/2011 | Mason et al. | |
| 2011/0166714 | A1* | 7/2011 | Stachnik | A62C 35/60 700/282 |
| 2011/0178644 | A1* | 7/2011 | Picton | E03B 7/071 700/282 |
| 2011/0238229 | A1* | 9/2011 | Woytowitz | A01G 25/167 700/284 |
| 2011/0264282 | A1* | 10/2011 | Blank | G05B 15/02 700/282 |
| 2012/0010758 | A1* | 1/2012 | Francino | G05B 17/02 700/291 |
| 2012/0036091 | A1* | 2/2012 | Cook | G06Q 50/06 705/412 |
| 2012/0095604 | A1* | 4/2012 | Alexanian | A01G 25/16 700/284 |
| 2012/0109387 | A1* | 5/2012 | Martin | A01G 25/167 700/284 |
| 2012/0158192 | A1* | 6/2012 | Sherwood | G01C 21/3492 700/282 |
| 2012/0239211 | A1* | 9/2012 | Walker | G05B 13/021 700/284 |
| 2012/0290140 | A1* | 11/2012 | Groeneveld | A01G 1/001 700/284 |
| 2013/0060389 | A1* | 3/2013 | Marsters | A01G 25/16 700/284 |
| 2014/0005843 | A1* | 1/2014 | Thomas | A01G 25/16 700/284 |
| 2014/0236868 | A1* | 8/2014 | Cook | A01G 25/16 705/412 |
| 2015/0095090 | A1* | 4/2015 | Altieri | G06Q 10/06313 705/7.23 |
| 2015/0100169 | A1* | 4/2015 | McKinney | H04L 67/10 700/284 |
| 2015/0105921 | A1* | 4/2015 | Shupe | A01G 25/16 700/284 |
| 2015/0120009 | A1* | 4/2015 | Killian | G05B 19/048 700/79 |

OTHER PUBLICATIONS

Rainbird Corporation, "Commercial Central Control Systems", Brochure, 2012, 8pgs, D40064A, Tucson, AZ.

Rainbird Corporation, "ESP-LX Modular Controller Installation, Programming, & Operation Guide", User Manual, 2006, 88 pgs, 636281-010 Rev A, Tucson, AZ.

Smart Watering Systems, "Measure. Manage. Monitor Smart Watering Systems Yorkdale Mall—Oxford Properties Toronto, Ontario 2009", Case Study/Flyer, 2009, 1 pg, Toronto Ontario, Canada.

Smart Watering Systems, "Measure. Manage. Monitor Smart Watering Systems RBC Towers—Bentall Property Mississauga, Ontario 2010", Case Study/Flyer, 2010, 1 pg, Mississauga, Ontario, Canada.

Smart Watering Systems, "Measure. Manage. Monitor Smart Watering Systems Wynford Place—Brookfield Residential Toronto, Ontario 2011", Case Study/Flyer, 2011, 1 pg, Toronto, Ontario, Canada.

Rainbird Corporation, "IQ v2.0 Central Control Software and Software Feature Packs", Tech Spec, 2010, 2pgs, D40031, Tucson, AZ.

* cited by examiner

IRRIGATION MANAGEMENT

This application is a continuation application of U.S. patent application Ser. No. 13/899,544 entitled "Irrigation Management," filed May 21, 2013, which claims priority to U.S. Provisional Patent Application No. 61/649,824 by Rudy Lars Larsen and entitled "Irrigation Management System," filed May 21, 2012, which are incorporated herein by reference in their entirety.

TECHNICAL FIELD

This disclosure relates generally to irrigation management, and more specifically to systems and methods for providing remote irrigation management of one or more facilities.

BACKGROUND OF RELATED ART

Water is becoming an increasingly scarce resource. This increasing scarcity is pressuring consumers and governments alike to consider how they use water and how they can use it more wisely. The costs of water are also increasing as a result of scarcity, and businesses are under pressure to reduce costs associated with using water.

Many businesses and users need water to maintain the grounds of their business facilities and their residences. Some estimates posit that landscape irrigation accounts for nearly one-third of all residential water use, and totals almost nine billion gallons per day. Much of that water is wasted due to inefficient irrigation methods and systems.

As a result, water users are looking for options to reduce water usage without negatively impacting their landscape. However, doing so often requires expertise in landscape irrigation and may require expensive equipment. Furthermore, some water users are unsure whether they will ever recoup the investment they make in the system. Many water users forgo the benefits of more sophisticated irrigation systems and waste water as a result.

BRIEF SUMMARY OF THE INVENTION

Disclosed herein is a method and system for providing irrigation management services. In one embodiment, the method involves visiting a first property having an irrigation system, identifying one or more characteristics of the first property that affect water usage, and developing an irrigation management plan for the property using the characteristics.

The method may also involve determining a value of irrigation management services at the first property. The irrigation manager may charge a fixed amount for the irrigation management services over a predetermined period of time. The irrigation manager may calculate an irrigation water cost savings for the predetermined period and determine a guaranteed maximum charge for the predetermined period of time by multiplying the irrigation water cost savings by a guaranteed rate. If the fixed amount exceeds the guaranteed maximum charge, the irrigation manager may refund or credit a difference between the fixed amount and the guaranteed maximum charge to the property owner or property manager.

The method may also involve communicatively connecting the controller for the irrigation system to a central computer at a remote location. The central computer may be communicatively connected with a plurality of second controllers that are associated with a other irrigation systems installed at numerous other properties. The central computer may implement the irrigation management plan remotely using the controller. The method may also involve continually monitoring the water usage at the first property and at the other properties using water usage data communicated to the central computer from the controllers and, in response to the water usage data from the controller indicating a fault in the irrigation system, diagnosing the fault using the water usage data, dispatching a technician to the property to repair the fault in the irrigation system.

The method may also involve dynamically adjusting the irrigation management plan from the remote computer based on factors such as forecasted rain, forecasted temperatures, high winds, and other weather-related events that may affect the irrigation management plan and facilitate water conservation.

Also disclosed herein is a system for providing irrigation management services. The system may include a plurality of controllers that control application of water by the irrigation system associated with the controller. The system may also include a central computer that is remote from each of the controllers and that is in communication with each of the controllers. The central computer may be configured to implement an irrigation management plan that is individualized to the location and based, at least in part, upon one or more characteristics of the location as determined by an on-site visit. The irrigation management plan may be guaranteed by the irrigation manager to provide a return on investment within a predefined period of time. The central computer may also detect faults in the irrigation systems using water usage data from the controllers associated with the irrigation system, run user-defined tests to diagnose the one or more faults in the irrigation systems, and notify a technician of the faults. The technician may then be dispatched to repair the faults on-site.

Other aspects, as well as features and advantages of various aspects, of the present invention will become apparent to those of skill in the art though consideration of the ensuing description, the accompanying drawings and the appended claims.

DETAILED DESCRIPTION

Referring in general to the accompanying drawings, various embodiments of the present invention are illustrated to show the structure and methods for an irrigation system. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the invention.

The following provides a more detailed description of ways to implement the present invention and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present invention may be practiced by numerous other solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

An irrigation management system includes a central computer 102 in communication with a plurality of individual, remotely located irrigation systems 110, 112, and 101. Each irrigation system 110, 112, and 101 may include a controller for controlling the application of water by the irrigation system 110, 112, and 101 at one or more stations corresponding to a particular portion or area of the irrigated landscape. The first irrigation system 110 may be owned by a first entity (such as a property manager or business) while the second irrigation system 112 may be owned by a second entity that is separate from the first entity. For example, each irrigation system 110, 112, and 101 may be for an office park owned by a different entity. In one embodiment, multiple irrigation systems (such as irrigation systems 110 and 112) are for properties that are commonly owned. For example, a commercial leasing company may own physically separate commercial leasing properties within a particular city.

Figure 1:
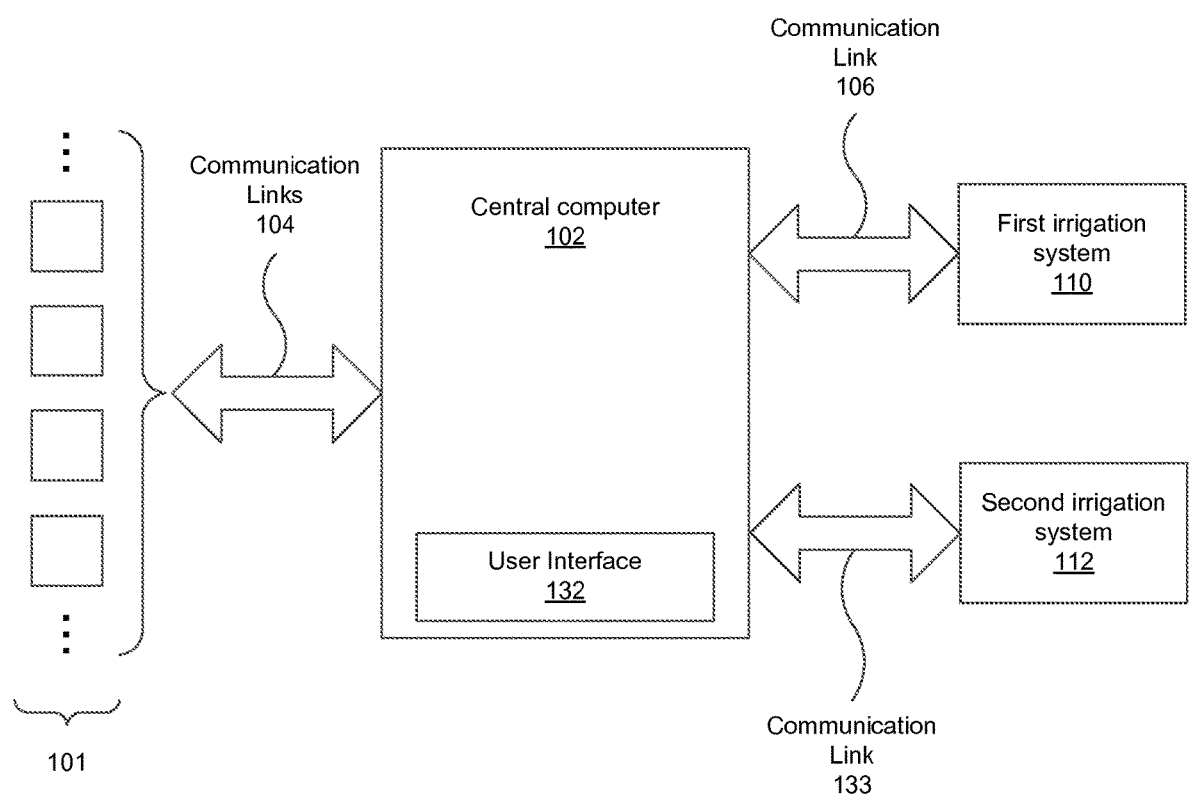
FIG. 1 illustrates an embodiment of an irrigation management system.

The central computer 102 may be a server accessible using the Internet. While FIG. 1 illustrates the central computer 102 as a single computing device, in certain embodiments, the central computer 102 may be a plurality of separate computing devices working together to provide the features described herein. In another embodiment, the central computer 102 is a desktop computing device running software to implement the methods described herein. In one embodiment, the central computer 102 is part of a system executing Rain Bird Corporation's IQ irrigation central control system.

The central computer 102 also includes a user interface 132 that allows users to access one or more functions of the central computer 102. The user interface 132 may be a graphical user interface (GUI) that runs on the central computer 102 and allows a user to interact with the central computer 102 through a keyboard, mouse, or other input device. In another embodiment, the user interface 132 is a web-implemented user interface that allows users to access the central computer 102 and its functionality from a separate computing device (such as a desktop computer or laptop) using browser software. The user interface 132 may also include one or more application programming interface (APIs) that allows one or more computer programs to access the functionality of the central computer 102.

The central computer 102 may store specific information about each irrigation system 110, 112, and 101. Such information may include specific information about each station in the irrigation system (e.g., the type(s) of valves, the number and type(s) of sprinkler heads on each station, etc.). In addition, the central computer 102 may store information on the area, topography and type(s) of landscaping covered by each station of the irrigation system 110, 112, and 101.

The central computer 102 may also communicate with one or more controllers of each irrigation system 110, 112, and 101. The controllers may communicate with the central computer 102 using communications links 106, 133, and 104 respectively. The communications links may be wired communications links (such as telephone or Ethernet connections), wireless communications links (such as Wi-Fi, cellular, or other), or a combination thereof. The controllers may communication information with the central computer 102 using an appropriate communications protocol such as TCP/IP. Each controller may communicate water flow information from each station of the irrigation system 110, 112, and 101. In addition, the central computer 102 may be configured to receive information about the amount(s) of non-irrigation water (e.g., precipitation, water from nearby sources, etc.) to which one or more parts of the landscape to which each station of the irrigation system corresponds is exposed. Such information may be collected in any suitable manner known in the art (e.g., with automated rain sensors, etc.).

In some embodiments, the central computer 102 may also collect climate information. The climate information may include weather forecast information (e.g., temperatures at various times of the day, humidity forecast, cloud cover forecast, precipitation forecast, etc.) and/or real-time weather data (e.g., current temperature, current humidity, current cloud cover, current precipitation and up-to-date precipitation levels, etc.). Other types of information may also be stored and/or collected by the central computer 102.

The central computer 102 may be programmed to monitor irrigation at one or more stations of a remote irrigation system 110, 112, and 101. Irrigation monitoring may include receipt of a flow signal from a monitored station and/or a monitored irrigation system 110, 112, and 101. When flow information used in conjunction with information about the types of sprinkler heads or other components of that station, the computer 102 may determine the amount of irrigation (i.e., volume of water) applied by that station. When considered in conjunction with an optimal irrigation level (which may determined by a landscape professional and input into the computer and, in some embodiments, modified based on other criteria, such as recent, current or forecast weather, etc.) for that station, the computer 102 may determine how the actual amount of irrigation applied by the station compares to the optimal irrigation level. In some embodiments, real-time irrigation monitoring may occur and, when the optimal irrigation level by a particular station is reached, the computer 102 may automatically terminate irrigation by that station. In other embodiments, any discrepancy, or any discrepancy beyond acceptable ranges, may then be output by the computer 102, used by the computer 102 to calculate and output a recommendation on modification of at least one future irrigation program for that station (e.g., if overwatering has occurred, reduce the next watering time, etc.) and/or used by the computer 102 to calculate and automatically modify at least one future irrigation program for that station.

In addition, the central computer 102 may be configured to provide an output indicative of potential problems with a monitored irrigation system, or a station of a monitored irrigation system 110, 112, and 101. For example, if the central computer 102 determines that the amount of irrigation applied to landscaping by a particular station of a monitored irrigation system 110, 112, and 101 exceeds irrigation that would have been applied if the station were operating normally, the computer 102 may be programmed to output a warning that there may be a leak, a bad sprinkler head or other component, or some other problem with that station. Similarly, the computer 102 may be programmed to output a warning if a flow sensor associated with a particular station continues to monitor water flow while the station is supposed to be turned off, as continued water flow may be indicative of a faulty valve.

In addition, the central computer 102 may collect information external to operation of a monitored irrigation system, such as weather or other climate information, evaporation information, transpiration information, or the like. With that external information, the central computer 102 may be programmed to adjust or modify a preprogrammed optimal irrigation amount and/or to determine and output and/or automatically implement modifications to programming for the monitored irrigation system 110, 112, and 101.

The central computer 102 may also be configured to implement an irrigation management plan that includes irrigation programs for each of the stations in the irrigation system. The irrigation management plans may be unique to each irrigation system 110, 112, and 101. In other embodiments, the irrigation management plans for like irrigation systems (i.e., those with similar landscapes) are the same. The central computer 102 may communicate the irrigation management plan to the controllers for each of the irrigation systems 110, 112, and 101, which controls then implement the irrigation management plan at the location.

In addition to including a central computer 102 and a plurality of remote irrigation systems 110, 112, and 101, an irrigation management system of the present invention may include one or more mobile devices that communicate with the central computer 102. Each mobile device may comprise a portable electronic device of a type known in the art, such as a smart phone, a tablet computer, or the like. The mobile device may be programmed to receive and display notifications regarding each monitored irrigation system 110, 112, and 101 from the central computer 102 and, in some embodiments (including embodiments where the central computer 102 automatically controls the monitored irrigation systems 110, 112, and 101 and embodiments where the central computer 102 does not automatically control the monitored irrigation system 110, 112, and 101), to enable remote control over each monitored irrigation system 110, 112, and 101 either through the central computer 102 or directly.

In one embodiment, applications for mobile devices may also be configured to receive reports from the central computer 102. For example, the property owner may have a mobile device with an application for receiving reports concerning water usage from the central computer 102. Where the property owner has multiple properties managed by the irrigation manager, the property owner may be able to consolidate reports for the multiple properties.

In another embodiment, the client may be able to enter commands for the controller into the application, which commands are sent to the controller 202. The client may be able to override the irrigation management plan using the application. The client may, for example, cause the controller 202 to perform extra watering for a particular station using the application on the mobile device. The application may be configured to send information concerning water usage above the irrigation management plan originating from the client to the central computer 102. The central computer 102 may track the amount of water outside of the irrigation management plan applied at the client's direction. The central computer 102 may report such usage to the irrigation manager, who can take such information into account in determining the cost effect of client-directed watering and its effect on the cost-recovery guarantee. The central computer 102 may similarly track client-directed watering events that are initiated from the controller 202. The irrigation manager may ensure that such usage does not count towards a guaranteed return on investment provided by the irrigation manager.

Figure 2:
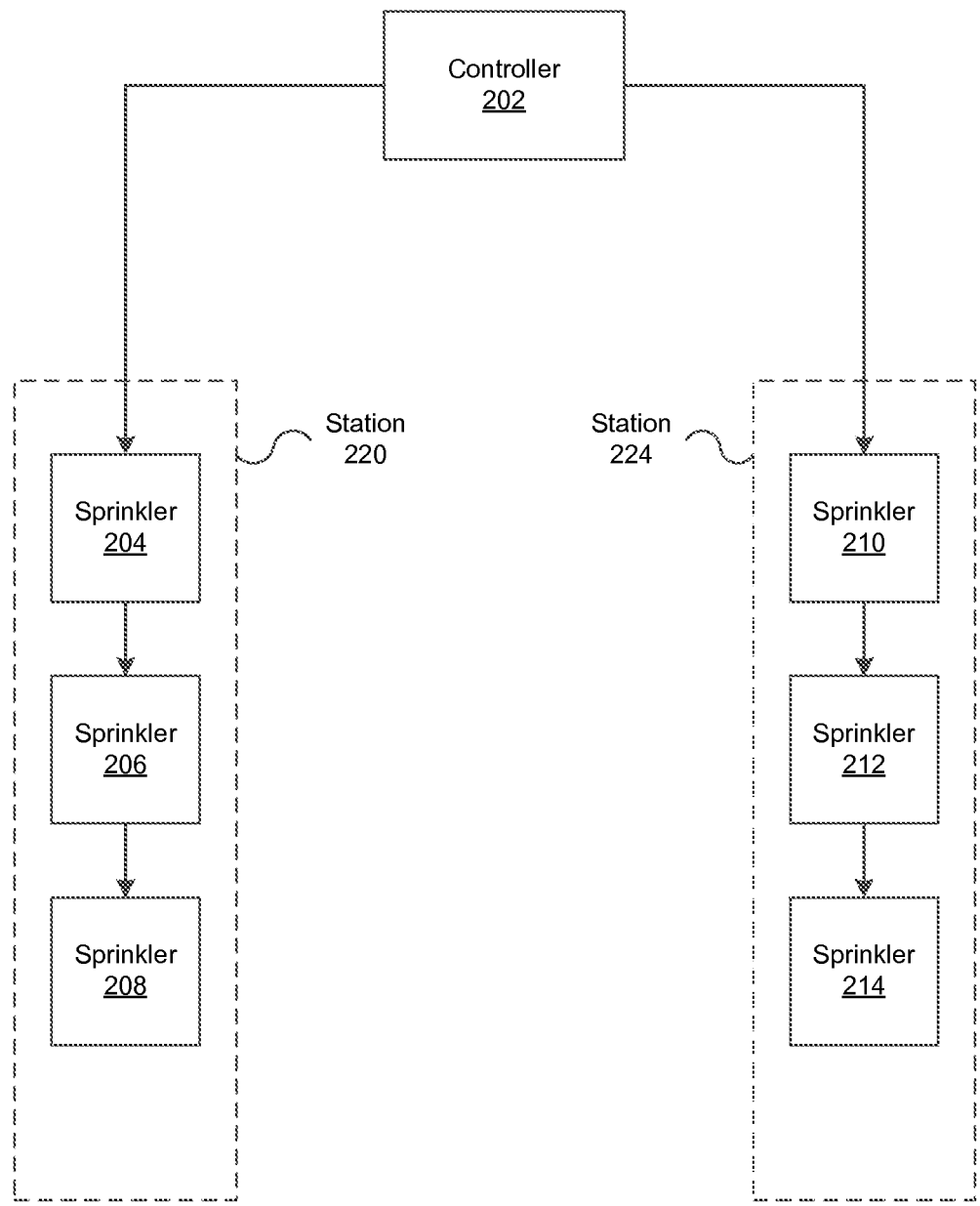
FIG. 2 is a block diagram of an embodiment of an irrigation system having a controller.

FIG. 2 illustrates a controller 202 for an irrigation system 200. The irrigation system 200 is a simplified representation of an irrigation system that may benefit from irrigation management services. A typical irrigation system 200 will include more stations and sprinklers than those shown. In the illustrated embodiment, the irrigation system 200 includes a controller 202 and stations 220 and 224. The station 220 contains sprinklers 204-208, and the station 224 contains sprinklers 210-214. The term "sprinkler" is used broadly to encompass a wide range of water distribution elements within a station such as pop-ups, bubblers, soaker hose, and other varieties of sprinkler heads and water distribution elements. The controller 202 may separately control each station 220 and 224. In a typical embodiment, the controller 202 will water the area associated with the station 220 at a first time, and the area associated with the station 224 at a second time. The controller 202 will typically cycle through the stations in the irrigation system 200 until the watering cycle is complete. As noted above, the stations 220 and 224 may each be associated with different areas of the property, and may serve areas with different needs. For example, the station 220 may be for a flower bed while the station 224 is for grass on a hillside.

In one embodiment, an irrigation manager visits the property with the irrigation system 200 to perform an initial site visit. At the site visit, the irrigation manager may review the current water usage and pattern set by the controller 202. The irrigation manager may also identify one or more characteristics of the property that affect water usage on the property. For example, the irrigation manager may note the plant material being watered by each station 220, 224 (whether flowers, shrubs, grass, or other), the soil composition at the first property and/or at the individual areas served by the stations 220, 224, and the climate at the first property. For example, the irrigation manager may note that the climate is arid if the property is located in a desert location. Other examples of characteristics the irrigation manager may note include the slope of the area associated with each station, the degree of exposure to sun and heat, and the health of the plant material under the current water application system.

In other embodiments, the irrigation system 200 may also include sensors that detect and collect irrigation-related data. The irrigation system 200 may include, for example, temperature sensors, moisture sensors, rain sensors, and others. The sensors may communicate the data they collect to the controller 202. The controller 202 may send this sensor data to the central computer 102.

The controller 202 may execute the irrigation management plan from the central computer 102, which irrigation management plan is individualized to the location of the irrigation system 200. The irrigation management plan may be guaranteed by the irrigation manager providing the irrigation management services to provide a return on investment within a predefined period of time. As explained below, the fee charged by the irrigation manager may be determined by estimating the water cost savings over a predetermined period of time (such as a year or an N-month period corresponding to the irrigation season), allocating between two-thirds and one-third of the estimated water cost savings over the predetermined period of time to the client, and setting the fee equal to the remaining water costs savings over the predetermined period of time.

The central computer 102 may receive the water usage data from the controller 202 and detect one or more faults in the irrigation system 200 using that water usage data. The central computer 102 may also run one or more user-defined tests to diagnose the faults in the irrigation system 200. The central computer 102 may do so by first confirming that a fault exists, and then by determining the fault type (i.e., what has failed to cause the fault). For example, if during watering the controller 202 reports excess water flow, the central computer 102 may stop all watering at the stations and continue to monitor the flow. If a flow is detected even when all watering is stopped, the test may indicate that the fault type is a break in the pipe. If no flow is detected, the central computer 102 may water each station at one-minute intervals and monitor the water usage by each station to identify which stations have a fault causing the excess water flow. Other tests for diagnosing faults in the irrigation system 200 may also be used. The central computer 102 may also notify a technician of the faults, allowing the technician to be dispatched to repair the faults. The central computer 102 may also determine the amount of water actually lost by the fault and the amount of water likely to be lost due to the fault.

In certain embodiments, the central computer 102 may be configured to automatically retrieve water usage information for the irrigation system 200 as recorded by the relevant water authority. For example, the central computer 102 may be configured to retrieve water usage information from a website for the local water authority. The client may be required to provide the central computer 102 with appropriate credentials to allow the central computer 102 to access the client's water usage information. In another embodiment, the irrigation manager may manually enter the water usage information as provided by the local water authority. The central computer 102 may compare the water usage information as reported by the water authority with the water usage information reported by the controller 202. If the reported water usage information differs by a threshold amount, the central computer 102 may report the discrepancy to the irrigation manager who may further calibrate the controller 202 and water usage measurement tools at the irrigation site 200.

Figure 3:
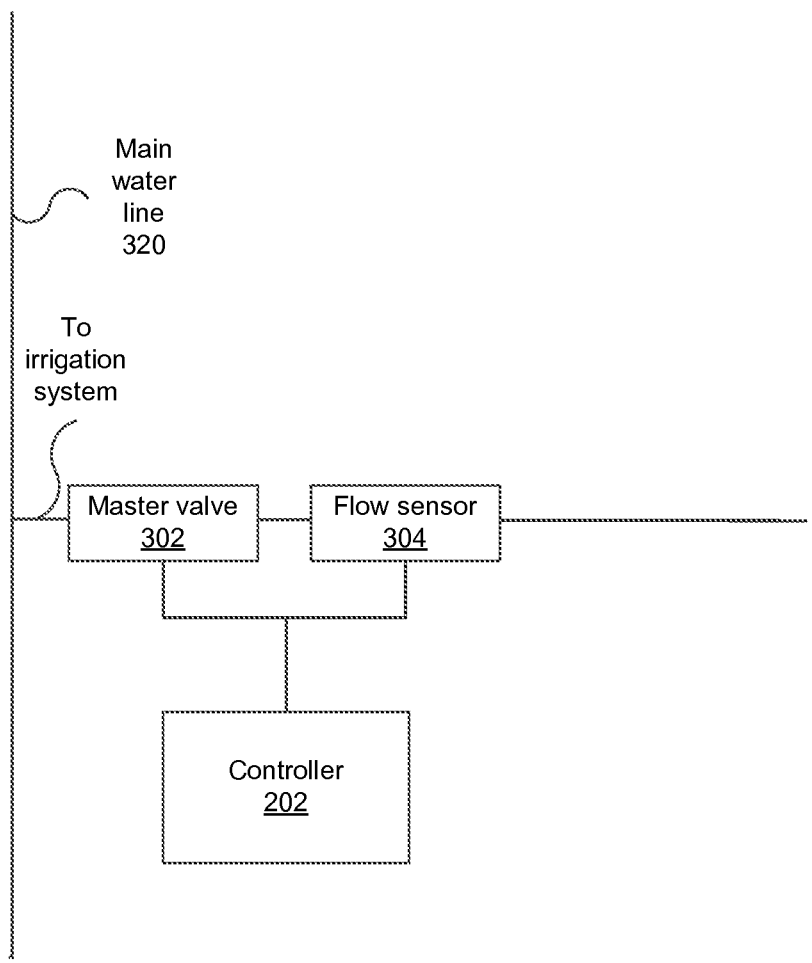
FIG. 3 is a schematic block diagram illustrating one embodiment of an irrigation system with a master valve and flow sensor.

FIG. 3 illustrates a system 300 that is a simplified representation of a main water line 320 from which the irrigation system receives water. In one embodiment, the irrigation manager may install a master valve 302 at the main water line 320 and a flow sensor 304. The irrigation manager may install the master valve 302 between the main water line 320 servicing the property and the irrigation system itself. The irrigation manager may also communicatively connect the master valve 302 with the controller 202 such that the controller 202 can open and close the master valve 302, thus restricting and allowing flow from the main water line 320 into the irrigation system. In one embodiment, the irrigation manager also installs a flow sensor 304 and communicatively connects the flow sensor 304 with the controller 202. The flow sensor 304 may also be installed between the main water line 320 and the irrigation system. In certain embodiments, a plurality of flow sensors 304 may be distributed at various locations within the irrigation system.

While FIG. 3 illustrates a master valve 302 and a flow sensor 304 as separate elements, in certain embodiments, the master valve 302 and the flow sensor 304 may be realized as part of the same unit. The system may also include a backflow preventer to prevent water from flowing out of the irrigation system and into the main water line 320.

Figure 4:
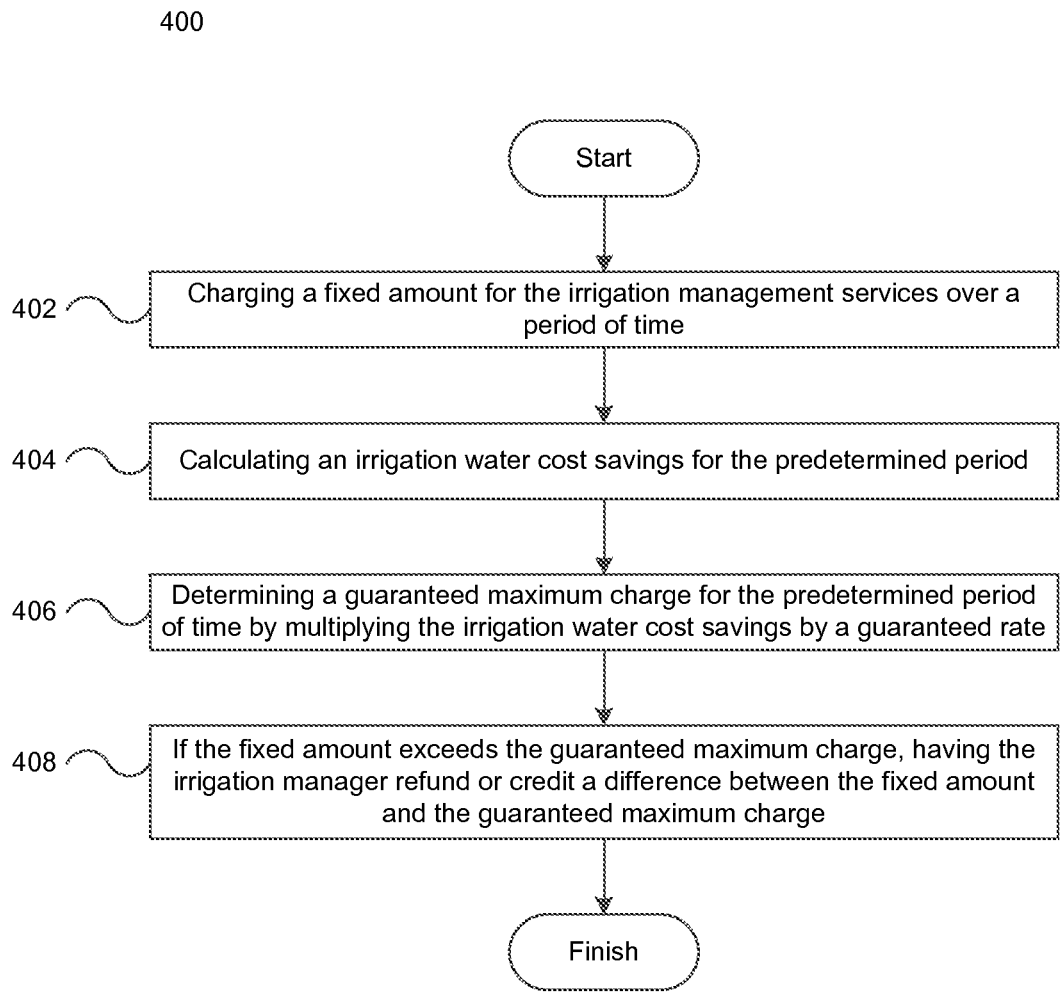
FIG. 4 is a flow chart diagram illustrating one embodiment of a method for determining a value of an irrigation management plan.

FIG. 4 illustrates one embodiment for determining a value of irrigation management services at a property. An irrigation manager may charge for the irrigation management services it provides in a number of different ways. In various embodiments, charges for the irrigation manager's services may be based on savings in the cost of irrigation water. Irrigation water cost savings may be determined in a number of different ways, including, but not limited to, irrigation water costs for a particular time period (e.g., month of the year, etc.) for one or more years just before an irrigation management system is implemented, irrigation water costs based on programming, the components of and the condition of an irrigation system just before an irrigation management system is implemented, or any other suitable bases.

In some embodiments, an irrigation manager may, at reference numeral 402, charge a fixed amount for the irrigation services over a period of time. The fixed amount may be a periodic (e.g., monthly, annual, etc.) fee. That periodic fee may be based on a percentage (e.g., 90%, 75%, etc.) of the expected savings in irrigation water costs. Thus, the method 400 may also include, at reference numeral 404, calculating an irrigation water cost savings for a predetermined period of time. In some embodiments, the periodic fee may be adjusted (e.g., annually, etc.) based upon a difference between expected irrigation needs and real irrigation needs for the most recent period of time. Alternatively, the periodic fee may be adjusted based on expected or forecast weather conditions for an upcoming period of time.

In some embodiments, the irrigation manager may actually guarantee that the cost of irrigation management will not exceed a fixed percentage (e.g., 90%, 75%, etc.) of the savings realized in irrigation water costs. The irrigation manager may, at reference numeral 406, determine a guaranteed maximum charge for the predetermined period of time by multiplying the irrigation water cost savings by a guaranteed rate. For example, if the irrigation manager provides services that save $1000 in irrigation costs one month, the irrigation manager may guarantee that its services for that month will not exceed 90% of that savings; i.e., $900.

The irrigation manager may provide the party receiving the services with refunds or credits. At reference numeral 408, if the fixed amount exceeds the guaranteed maximum charge, the irrigation manager may refund or credit a difference between the fixed amount and the guaranteed maximum charge. For example, if the irrigation manager guarantees that its charges will not exceed a fixed percentage (e.g., 90%, etc.) of the savings in irrigation water costs, but the irrigation manager charges a fixed monthly amount (e.g., $1,000, etc.) for irrigation management services, and the irrigation manager's charges for that month exceed the fixed percentage of the savings in irrigation water costs for that month (e.g., 90%×$1,000=$900, etc.), the irrigation manager may refund or credit the difference (e.g., $100, etc.). As another example, partial refunds or credits may be provided in circumstances where expected water savings, or a predetermined percentage thereof (e.g., 90%, 75%, etc.) were not realized. If a party receiving the irrigation manager's services pays a monthly fee of f, based on an expected monthly savings of sE, and the actual savings for that month was less than 90% of sE (i.e., 0.9×sE), the irrigation manager may refund or credit ten percent (10%) of the fee for that month to the party that receives the irrigation manager's services.

In one embodiment, the irrigation manager installs the irrigation system at no charge in exchange for the client agreeing to use the irrigation management services for a predetermined length of time sufficient for the irrigation manager to recoup the cost of the investment. In another embodiment, the irrigation manager upgrades the irrigation system with one or more components to enable communications with the central computer 102 as described above at no charge in exchange for the client agreeing to use the irrigation management services for a predetermined period of time. Such an approach may allow property owners and managers who may otherwise forgo the benefits of remote irrigation management due to the upfront cost to benefit.

Figure 5:
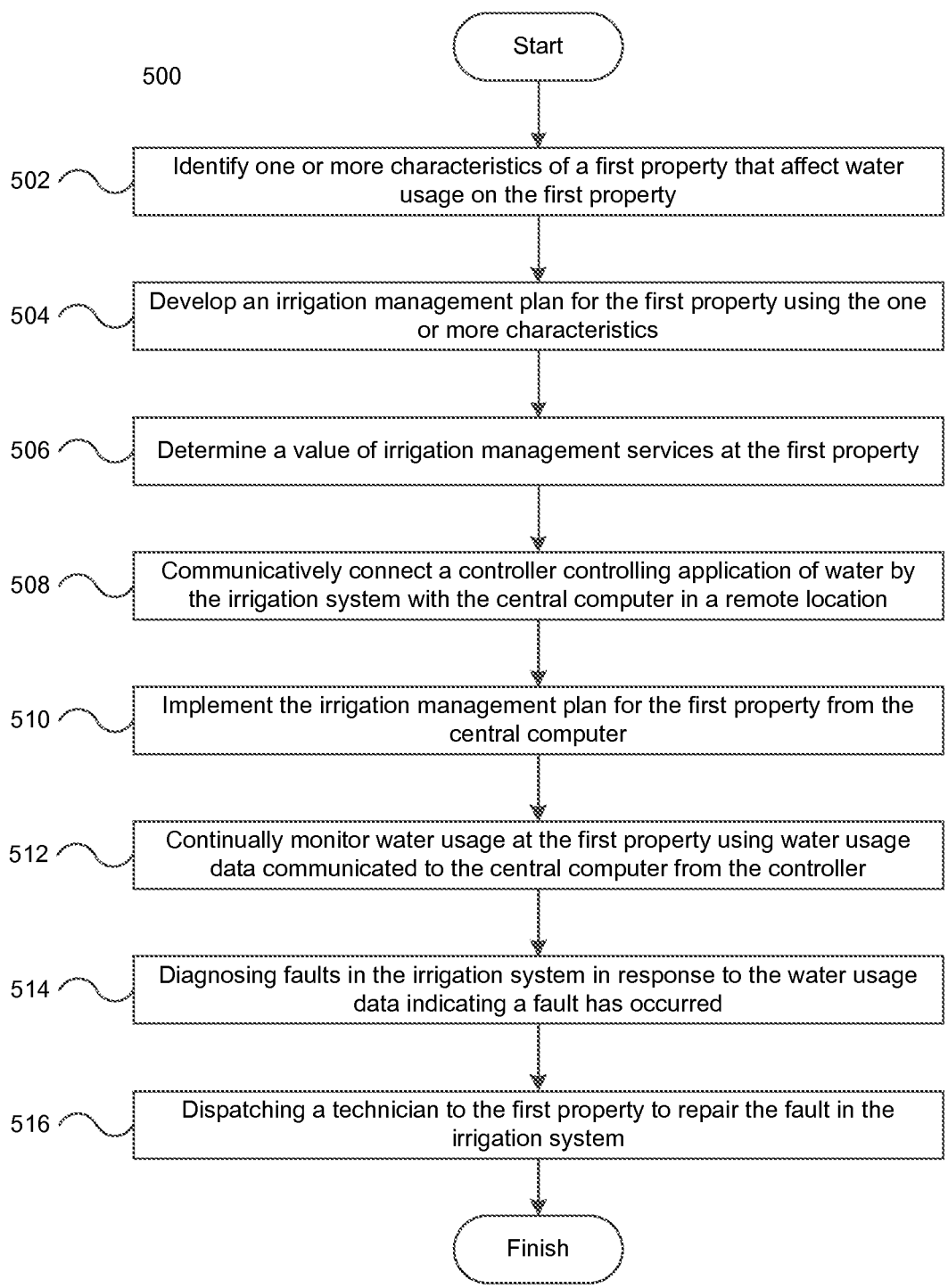
FIG. 5 is a flow chart diagram illustrating one embodiment of a method for providing irrigation management services.

FIG. 5 illustrates one embodiment of a method 500 for providing irrigation management services. The method 500 may begin, at reference numeral 502, with visiting a first property having an irrigation system and identifying one or more characteristics of the first property that affect water usage on the first property. As noted above, examples of such characteristics include, but are not limited to, plant material at the site, soil composition, climate, exposure to sun, slope and other characteristics.

The method may also involve, at reference numeral 504, developing an irrigation management plan for the first property using the one or more characteristics. The irrigation management plan specifies how much water is to be applied and the manner in which the water is applied. The irrigation management plan may tailor water application to the characteristics of the individual stations of the irrigation system. Thus, for example, a station watering an area located on a hill may water in 5 minute intervals to allow the water to sufficiently soak in without losing water to run off caused by saturation, while a flower bed may be watered for a ten-minute period with no intervals.

In certain embodiments, the irrigation manager may make changes to the stations conducive to implementing the irrigation management plan. For example, the irrigation manager may swap out a first sprinkler head for a second sprinkler head with a different flow rate, add or remove sprinkler heads from the irrigation system, and make other appropriate changes to maximize the effectiveness of the irrigation management plan.

The method may include, at reference numeral 506, determining the value of the irrigation management services at the first property. In one embodiment, this is done according to the method shown in FIG. 4 and discussed above.

The method may include, at reference numeral 508, communicatively connecting the controller that controls application of water by the irrigation system with the central computer 102 that is located in a remote location. The central computer 102 may, for example, be located at the offices of the irrigation manager, in a server facility, or other location that is remote from the location of the irrigation system. The central computer 102 may also be communicatively connected to a plurality of second controllers installed at a plurality of second properties that are owned by entities separate from the entity that owns the first property. The owners of the second properties may have also contracted with the irrigation manager for irrigation services. The irrigation manager may provide the above services to various separate property owners.

Once the central computer 102 is communicatively connected to the controller, the method 500 may involve, at reference numeral 510, implementing the irrigation management plan for the first property from the central computer 102. In one embodiment, this involves the irrigation manager inputting the irrigation management plan that is customized for the first property into the central computer 102. The central computer 102 may then communicate that irrigation management plan to the controller for the irrigation system installed at the first property. In one embodiment, the central computer 102 transmits a schedule for irrigation which is received, stored, and implemented by the controller. The central computer 102 may transmit changes to the irrigation management plan thereafter. In another embodiment, the central computer 102 transmits individual commands that cause water to be applied according to the irrigation management plan, which commands are executed by the controller. For example, the central computer 102 may send a command at 8:00 at night to water station one for ten minutes. In another embodiment, the central computer transmits the schedule and maintains the ability to override the schedule with individual commands sent to the controller.

The method 500 may also involve, at reference numeral 512, continually monitoring water usage at the first property by the irrigation system using water usage data communicated to the central computer 102 from the controller. The water usage data may include, for example, the flow rate as measured by the flow sensor 304, the time periods in which water was applied, identifiers for the stations to which the water is being applied, and other water usage data. The water usage data may also include sensor data related to water application; for example, the water usage data may include temperature data, moisture sensor readings, and other sensor data from sensors in communication with the controller 202.

The method 500 may also include, at reference numeral 514, diagnosing faults in the irrigation system in response to the water usage data indicating a fault has occurred. For example, if the flow sensor 304 detects water flows when the water is supposed to be turned off, the flow may indicate a break in the irrigation system pipes. In another embodiment, the central computer 102 may determine that more water than expected was applied to a particular station during the watering interval for that station. The central computer 102 may alert the irrigation manager that the water amount applied to a particular station was outside tolerance levels for the system, and the irrigation manager may diagnose the problem as a broken sprinkler head. In another embodiment, a moisture sensor may indicate a below-expected moisture reading after watering. The irrigation manager may diagnose the problem as a blocked sprinkler head.

The method 500 may include, at reference numeral 516, dispatching a technician to the first property to repair the fault in the irrigation system. As a result, the fault in the irrigation system can be quickly detected and repaired without causing unnecessary loss of water or damage to the landscape due to over-watering or under-watering. Furthermore, the fault can be quickly repaired without inconvenience to the property owner.

In one embodiment, the central computer 102 sends one or more commands that shut the master valve 302, thus preventing flow of water from the main water line 320 into the irrigation system, in response to detecting a break in the pipe of the irrigation system. The central computer 102 may be configured to send the commands automatically upon detecting a water usage data indicative of broken pipe. In other embodiments, a technician manually sends the commands to shut the master valve 302.

Where the fault is a broken component in one particular station of the irrigation system 200, the central computer 102 may send one or more commands to the controller 202 causing the controller 202 not to distribute water using the station with the broken irrigation component. For example, if a station has a broken sprinkler head causing excess water to flow, the central computer 102 may cause the controller 202 to continue implementing the irrigation management plan, but to skip the station with the broken sprinkler head. As above, modifying the irrigation management plan to stop watering from the station with the broken irrigation component may be automated by the central computer 102, or such a modification to the irrigation management plan may be implemented by a technician.

In one embodiment, the technician dispatched to the location to repair the fault in the irrigation system may be provided with a diagnosis of the fault. As a result, the technician may determine the appropriate equipment to repair the fault, the severity of the fault, and the time necessary to repair the fault using the water usage data. As a result, a technician's time may be used more effectively and predictably.

The technician may provide a repair notification to the central computer 102 in response to repairing the fault in the irrigation system 200. In one embodiment, the technician uses a mobile device (such as a cellular phone) to communicate that the repair is complete. The central computer 102 may resume the normal irrigation management plan in response to receiving the notification. In certain embodiments, the technician can send commands to the controller 202 using the mobile device, as described above. The technician may send commands to the controller 202 causing the controller 202 to use the repaired faulty section of the irrigation system in order to confirm that the repair is effective.

In one embodiment, the irrigation manager may use a mobile application to enter the irrigation management plan while on site. For example, the irrigation manager may, for each station in the irrigation system, enter a watering time and duration into the mobile application. Once the irrigation manager completes entry of the irrigation management plan, the application may transmit the irrigation management plan to the central computer 102. The central computer 102 may receive the irrigation management plan and save it for later execution.

Similarly, in one embodiment, the irrigation manager may set the irrigation management plan using the controller for the irrigation system. The irrigation manager may enter the watering time and duration, along with other aspects of the irrigation management plan into the controller. The irrigation manager may enter a code to cause the irrigation management plan to transmit to the central computer 102 and to be saved by the central computer 102 as the irrigation management plan for the irrigation system.

In one embodiment, the method involves assigning a severity to the fault and assigning a time frame for response. The severity of the fault may be calculated by determining: how much water will be wasted if the fault is not fixed immediately; and the impact on the plant material if the fault is not fixed immediately. For example, a broken pipe that cannot be controlled by shutting the master valve 302 may be assigned a highest priority. A faulty sprinkler head causing reduced water distribution in an area with low water needs may be assigned a lowest priority.

The time frame for the response may be based, at least in part, upon the severity of the fault and a weather forecast for the area comprising the irrigation system. For example, a severe fault such as a broken, gushing pipe may require an immediate response. If a broken sprinkler head is detected upon completion of a watering cycle, and the water cycle repeats every three days, the time frame may be set for three days. If rain is in the forecast, which rain will further delay application of water, the time frame may be extended to the next time the station with the broken sprinkler head will run.

In certain embodiments, the method may also involve regular visits to the irrigation system 200 location by the irrigation manager or a technician to verify the effectiveness of the irrigation management plan. The irrigation manager may, for example, confirm that the plant material is receiving sufficient water to facilitate strong growth and development and to ensure that plant material is not suffering from overwatering. The irrigation manager may make adjustments to the irrigation management plan based on the results of the physical inspection.

In one embodiment, the central computer 102 is further configured to execute a pre-season test pattern at each irrigation system in communication with the central computer 102. In such an embodiment, the central computer 102 may, prior to the start of the season where irrigation is necessary, run tests on each station within each irrigation system to diagnose and identify problems. For example, the central computer 102 may cause each station to run for 30 seconds and monitor the water usage of each station. The central computer 102 may generate a diagnostic report of problems detected during the testing. The irrigation manager may then go to the site to perform pre-season repairs and maintenance; however, the irrigation manager may be able to spend less time inspecting each sprinkler and/or station at the site since the irrigation manager will have already been notified of existing faults.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed:

1. A method for providing irrigation management services, the method comprising:
   managing an irrigation system installed at a property, the irrigation system comprising a master valve, at least one flow sensor and at least one moisture sensor:
   identifying one or more characteristics of the property affecting water usage on the property;
   developing an irrigation management plan using the one or more characteristics for the property, the irrigation management plan being applied by the irrigation system;
   communicatively connecting a controller for the irrigation system with a central computer at a remote location;

installing the master valve between the main water line and the property, wherein the master valve is in wired or wireless communication with the controller;
installing the least one flow sensor at the master valve, wherein the at least one flow sensor is in wired or wireless communication with the controller;
installing the least one moisture sensor, wherein the at least one moisture sensor is in wired or wireless communication with the controller;
communicatively connecting at least one mobile device with the central computer, the at least one mobile device configured to receive notifications from the central computer and to remotely control operation of the irrigation system;
signaling the controller from the central computer the irrigation management plan for the property;
monitoring effectiveness of the irrigation management plan using the central computer comprising:
  signaling the central computer from the controller with water usage data from either the at least one flow sensor or the at least one moisture sensor of the irrigation system;
  determining a fault in the irrigation system based on the water usage data, and, in response to determining the fault in the irrigation system, assigning a time frame for response to the fault based on a weather forecast for the property;
  adjusting the irrigation management plan from the central computer based on the water usage data to improve the effectiveness of the irrigation management plan;
  signaling the controller, from the central computer an adjusted irrigation management plan; and
  notifying a user, through the at least one mobile device, of the water usage data; and
calculating a water cost savings of irrigation water costs;
charging a cost of the irrigation management services based on the water cost savings;
tracking an adjusted irrigation management plan against an original developed irrigation management plan, wherein the adjusted irrigation management plan comprises receiving an instruction from the at least one mobile device regarding client-directed watering, and wherein client-directed watering comprises applying water in excess of the original developed irrigation management;
determining a cost effect of the adjusted irrigation management plan against the original developed irrigation management plan; and
wherein the step of charging a cost of the irrigation management services based on the water cost savings comprises adding the cost effect of the adjusted irrigation management plan to the water cost savings to ensure that client-directed watering does not reduce a water cost savings of the original developed irrigation management plan.

2. The method of claim 1, further comprising, for each property, determining an estimated savings associated with the irrigation management plan.

3. The method of claim 2, further comprising, for each property, guaranteeing a property manager for the property a return on investment within a predefined time period as a result of implementing the irrigation management plan from the central computer.

4. The method of claim 1, further comprising identifying a location of the fault in the irrigation system using the water usage data.

5. The method of claim 3, further comprising identifying a water loss caused by the fault in the irrigation system using the water usage data.

6. The method of claim 4, further comprising assigning a severity to the fault based on water usage data indicating an amount of lost water for a duration of the fault and an impact on a plant material for a duration of the fault.

7. The method of claim 1, comprising: tracking at least one adjustment in the irrigation management plan provided to the irrigation system by a client;
determining a cost increase of the at least one adjustment in the irrigation management plan provided to the irrigation system by the client; and
wherein the step of charging a cost of the irrigation management services based on the water cost savings comprises adding the cost increase of the adjusted irrigation management plan to an original water cost savings to ensure that the at least one adjustment by the client does not reduce the original water cost savings of the irrigation management plan.

8. A method for providing irrigation management services, the method comprising:
managing an irrigation system installed at a property, the irrigation system comprising at least one flow sensor and at least one moisture sensor:
  identifying one or more characteristics of the property affecting water usage on the property;
  developing an irrigation management plan using the one or more characteristics for the property, the irrigation management plan being applied by the irrigation system;
  communicatively connecting at least one controller for the irrigation system with a central computer at a remote location;
  installing the at least one flow sensor at a master valve, wherein the at least one flow sensor is in wired or wireless communication with the controller;
  installing the at least one moisture sensor, wherein the at least one moisture sensor is in wired or wireless communication with the controller;
  communicatively connecting at least one mobile device with the central computer;
  signaling the controller from the central computer the irrigation management plan for the property;
  monitoring effectiveness of the irrigation management plan using the central computer comprising:
    signaling the central computer from the controller with water usage data from either the at least one flow sensor or the at least one moisture sensor of the irrigation system;
    adjusting the irrigation management plan from the central computer based on the data to improve the effectiveness of the irrigation management plan;
    signaling the controller, from the central computer an adjusted irrigation management plan; and
    continuously monitoring the water usage at the property using the water usage data communicated to the central computer from the controller;
    comparing the water usage data at the property against water usage data from a respective water authority through the central computer;
    determining if the water usage data at the property differs from the water usage data from the respective water authority by a threshold amount, and when the water usage data at the property differs from the water usage data from the respective water authority by the threshold amount, calibrating the at least one flow sensor; and outputting a recommendation on an adjusted irrigation management plan from the central computer, based on water usage data;

calculating a water cost savings of irrigation water costs;

charging a cost of the irrigation management services based on the water cost savings;

tracking at least one adjustment in the irrigation management plan provided to the irrigation system by a client;

determining a cost increase of the at least one adjustment in the irrigation management plan provided to the irrigation system by the client; and wherein the step of charging a cost of the irrigation management services based on the water cost savings comprises adding the cost increase of the adjusted irrigation management plan to an original water cost savings to ensure that the at least one adjustment by the client does not reduce the original water cost savings of the irrigation management plan.

9. The method of claim 8 comprising: adjusting the irrigation management plan from the at least one mobile device in communication with the central computer to improve the effectiveness of the irrigation management plan.

10. The method of claim 9, comprising: tracking the adjusted irrigation management plan against an original developed irrigation management plan.

11. The method of claim 10, comprising: determining a cost effect of the adjusted irrigation management plan against the original developed irrigation management plan; and adjusting the cost of the irrigation management services based on the adjusted irrigation management plan.

12. The method of claim 9, comprising: tracking at least one adjustment in the irrigation management plan provided to the irrigation system by a client.

13. The method of claim 12, comprising: determining a cost effect of the adjustment in the adjusted irrigation management plan by the client; and adjusting the cost of the irrigation management services based on the adjusted irrigation management plan.

14. The method of claim 8, wherein adjusting the irrigation management plan is automatically modified and implemented by the central computer and the adjusted irrigation management plan is relayed to the user.

15. A method for providing irrigation management services, the method comprising:

managing an irrigation system installed at a property, the irrigation system comprising a master valve, at least one flow sensor and at least one moisture sensor:
identifying one or more characteristics of the property affecting water usage on the property;
developing an irrigation management plan using the one or more characteristics for the property, the irrigation management plan being applied by the irrigation system;

communicatively connecting a controller for the irrigation system with a central computer at a remote location;

installing the master valve between the main water line and the property, wherein the master valve is in wired or wireless communication with the controller;

installing the least one flow sensor at the master valve, wherein the at least one flow sensor is in wired or wireless communication with the controller;

installing the least one moisture sensor, wherein the at least one moisture sensor is in wired or wireless communication with the controller;

communicatively connecting at least one mobile device with the central computer, the at least one mobile device configured to receive notifications from the central computer and to remotely control operation of the irrigation system;

signaling the controller from the central computer the irrigation management plan for the property;

monitoring effectiveness of the irrigation management plan using the central computer comprising:
signaling the central computer from the controller with water usage data from either the at least one flow sensor or the at least one moisture sensor of the irrigation system;
determining a fault in the irrigation system based on the water usage data, and, in response to determining the fault in the irrigation system, assigning a time frame for response to the fault based on a weather forecast for the property;
adjusting the irrigation management plan from the central computer based on the water usage data to improve the effectiveness of the irrigation management plan;
signaling the controller, from the central computer an adjusted irrigation management plan; and
notifying a user, through the at least one mobile device, of the water usage data; and calculating a water cost savings of irrigation water costs;

charging a cost of the irrigation management services based on the water cost savings;

tracking at least one adjustment in the irrigation management plan provided to the irrigation system by a client;

determining a cost increase of the at least one adjustment in the irrigation management plan provided to the irrigation system by the client; and wherein the step of charging a cost of the irrigation management services based on the water cost savings comprises adding the cost increase of the adjusted irrigation management plan to an original water cost savings to ensure that the at least one adjustment by the client does not reduce the original water cost savings of the irrigation management plan.

\* \* \* \* \*